(12) United States Patent
Liu et al.

(10) Patent No.: US 11,470,645 B2
(45) Date of Patent: Oct. 11, 2022

(54) CHANNEL OCCUPANCY TIME AWARE SENSING AND RESOURCE SELECTION FOR NEW RADIO-UNLICENSED SIDELINK

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US); Ozcan Ozturk, San Diego, CA (US); Tao Luo, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/098,242

(22) Filed: Nov. 13, 2020

(65) Prior Publication Data
US 2022/0159725 A1    May 19, 2022

(51) Int. Cl.
| | |
|---|---|
| *H04W 74/08* | (2009.01) |
| *H04W 28/08* | (2009.01) |
| *H04W 28/02* | (2009.01) |
| *H04W 72/02* | (2009.01) |
| *H04W 74/00* | (2009.01) |

(52) U.S. Cl.
CPC ... *H04W 74/0825* (2013.01); *H04W 28/0294* (2013.01); *H04W 28/0875* (2020.05); *H04W 72/02* (2013.01); *H04W 74/008* (2013.01); *H04W 28/0215* (2013.01)

(58) Field of Classification Search
CPC ................................................ H04W 88/00–06
See application file for complete search history.

(56) References Cited

U.S. PATENT DOCUMENTS

| | | | |
|---|---|---|---|
| 2016/0007368 A1* | 1/2016 | Moon ................... | H04W 56/00 370/329 |
| 2017/0013596 A1* | 1/2017 | van Phan .............. | H04W 72/02 |

(Continued)

FOREIGN PATENT DOCUMENTS

WO    WO-2020164439 A1    8/2020

OTHER PUBLICATIONS

International Search Report and Written Opinion—PCT/US2021/071869—ISA/EPO—dated Feb. 11, 2022.

*Primary Examiner* — San Htun
(74) *Attorney, Agent, or Firm* — Liem T. Do

(57) ABSTRACT

Channel occupancy time (COT) aware sensing and resource selection for new radio-unlicensed (NR-U) sidelink operations is disclosed. A first sidelink user equipment (UE) determines a sensing window or resource selection window (RSW) based on a projected listen-before-talk (LBT) completion time. The UE may sense for a subset of sideline resources within the RSW and COT-SI from a neighboring sidelink UE including identification of a COT initiated by the neighboring UE and one or more parameters associated with the COT. The UE may identify in-COT resources of located within the COT and out-COT resources located outside of the COT and then randomly select a set of transmission resources from the in-COT and out-COT resources. The UE may then transmit to a second UE using the set of transmission resources.

30 Claims, 11 Drawing Sheets

(56) References Cited

U.S. PATENT DOCUMENTS

| | | | |
|---|---|---|---|
| 2017/0034685 A1* | 2/2017 | Jiang ................. | H04W 74/0816 |
| 2018/0027554 A1* | 1/2018 | Yerramalli ........ | H04W 28/0278 |
| | | | 370/329 |
| 2019/0306923 A1 | 10/2019 | Xiong et al. | |
| 2020/0305191 A1* | 9/2020 | Moon ............... | H04W 72/1268 |
| 2020/0314901 A1 | 10/2020 | Bhattad et al. | |
| 2021/0092783 A1 | 3/2021 | Sun et al. | |

* cited by examiner

CHANNEL OCCUPANCY TIME AWARE SENSING AND RESOURCE SELECTION FOR NEW RADIO-UNLICENSED SIDELINK

BACKGROUND

Field

Aspects of the present disclosure relate generally to wireless communication systems having user equipment (UE)-initiated channel occupancy time (COT) management, and, more particularly, to COT aware sensing and resource selection for new radio (NR)-unlicensed (NR-U) sidelink (NR-U SL) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a first user equipment (UE) includes determining, based on a projected listen-before-talk (LBT) completion time, at least one of a sensing window or a first resource selection window, sensing, based on the determining, in a sidelink resource pool within a shared communication band for a subset of resources from the sidelink resource pool that are within the first resource selection window, and channel occupancy time (COT) sharing information (COT-SI) from one or more neighboring UEs, wherein the COT-SI includes identification of a COT initiated by the one or more neighboring UEs and one or more parameters associated with the COT, identifying, based on the sensing, one or more in-COT resources of the subset of resources located within the COT and one or more out-COT resources of the subset of resources located outside of the COT, randomly selecting, based on the identifying and in response to a resource selection trigger, a set of transmission resources from one of more of the one or more in-COT resources and the one or more out-COT resources, and transmitting, to a second UE using the set of transmission resources.

In an additional aspect of the disclosure, a first UE configured for wireless communication includes means for determining, based on a projected LBT completion time, at least one of a sensing window or a first resource selection window, means for sensing, based on the determining, in a sidelink resource pool within a shared communication band for a subset of resources from the sidelink resource pool that are within the first resource selection window, and COT-SI from one or more neighboring UEs, wherein the COT-SI includes identification of a COT initiated by the one or more neighboring UEs and one or more parameters associated with the COT, means for identifying, based on the sensing, one or more in-COT resources of the subset of resources located within the COT and one or more out-COT resources of the subset of resources located outside of the COT, means for randomly selecting, based on the identifying and in response to a resource selection trigger, a set of transmission resources from one of more of the one or more in-COT resources and the one or more out-COT resources, and means for transmitting, to a second UE using the set of transmission resources.

In an additional aspect of the disclosure, a non-transitory computer-readable medium having program code recorded thereon. The program code further includes code to determine, based on a projected LBT completion time, at least one of a sensing window or a first resource selection window, code to sense, based on the determination, in a sidelink resource pool within a shared communication band for a subset of resources from the sidelink resource pool that are within the first resource selection window, and COT-SI from one or more neighboring UEs, wherein the COT-SI includes identification of a COT initiated by the one or more neighboring UEs and one or more parameters associated with the COT, code to identify, based on the sensing, one or more in-COT resources of the subset of resources located within the COT and one or more out-COT resources of the subset of resources located outside of the COT, code to randomly select, based on the identifying and in response to a resource selection trigger, a set of transmission resources from one of more of the one or more in-COT resources and the one or more out-COT resources, and code to transmit to a second UE using the set of transmission resources.

In an additional aspect of the disclosure, an apparatus configured for wireless communication is disclosed. The apparatus includes at least one processor, and a memory coupled to the processor. The processor is configured to determine, based on a projected LBT completion time, at least one of a sensing window or a first resource selection window, code to sense, based on the determination, in a sidelink resource pool within a shared communication band for a subset of resources from the sidelink resource pool that are within the first resource selection window, and COT-SI from one or more neighboring UEs, wherein the COT-SI includes identification of a COT initiated by the one or more neighboring UEs and one or more parameters associated with the COT, to identify, based on the sensing, one or more in-COT resources of the subset of resources located within the COT and one or more out-COT resources of the subset of resources located outside of the COT, to randomly select, based on the identifying and in response to a resource selection trigger, a set of transmission resources from one of more of the one or more in-COT resources and the one or more out-COT resources, and to transmit to a second UE using the set of transmission resources.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
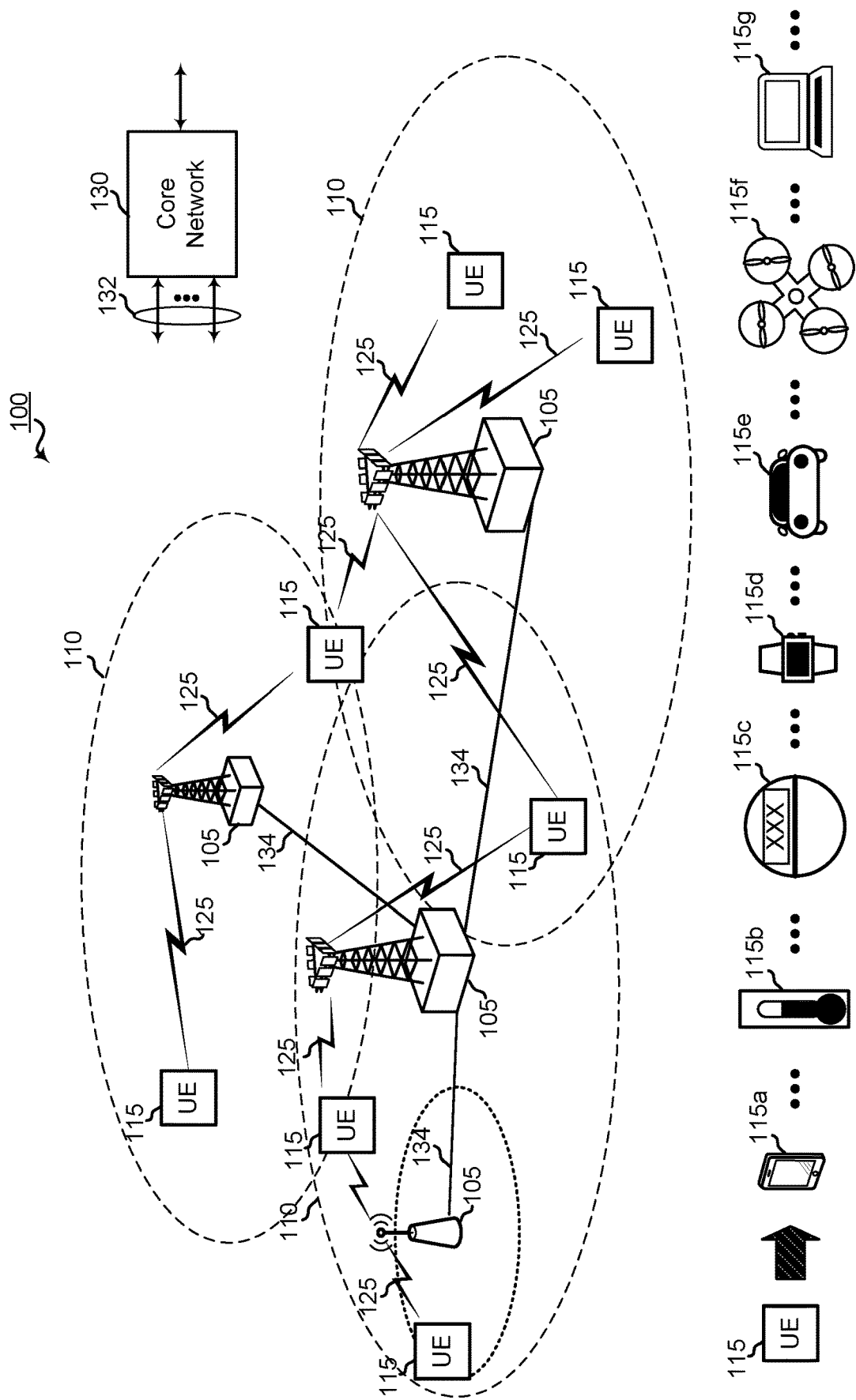
FIG. 1 is a block diagram illustrating details of an example wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support COT aware sensing and resource selection for NR-U sidelink communications. Particular implementations of the subject matter described in this disclosure may be implemented to realize one or more of the following potential advantages or benefits. In some aspects, the present disclosure provides techniques for COT aware sensing and resource selection for NR-U sidelink communications that allow for more efficient use of shared resources. The example aspects of COT aware sensing and resource selections may further increase transmission reliability by selecting sidelink resources that offer a higher LBT success rate among the available transmission resources.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports COT aware sensing and resource selection in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a wearable device (UE 115d), a tablet computer, a laptop computer (UE 115g), or a personal computer. In some examples, a UE 115 may also refer to a wireless local loop (WLL) station, an Internet-of-things (IoT) device, an Internet-of-everything (IoE)

device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=\frac{1}{30,720,000}$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
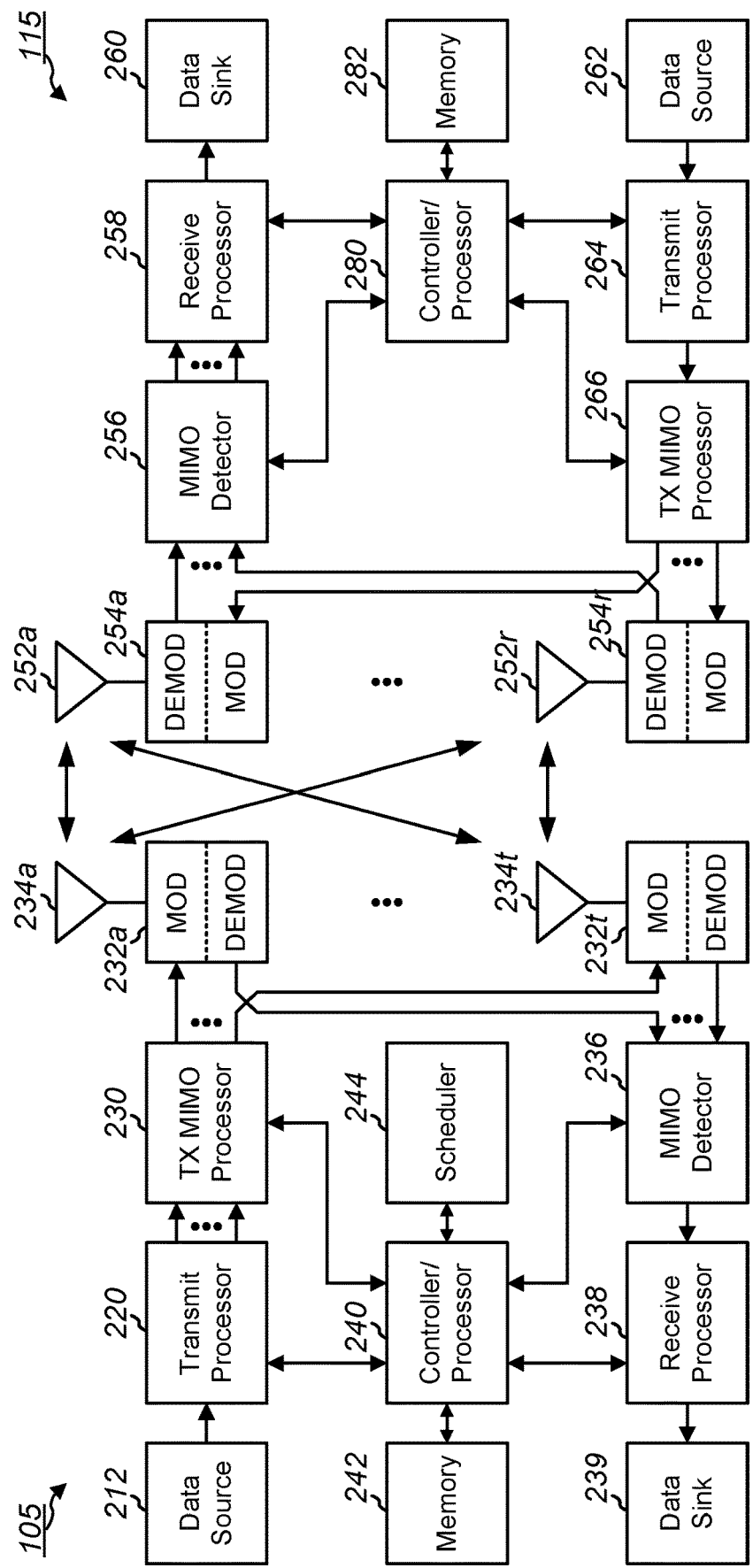
FIG. 2 is a block diagram illustrating an example design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 5, and/or other processes for the techniques described herein. The memories 242 and 282 may store data and program codes for the base station 105 and the UE 115, respectively. A scheduler 244 may schedule UEs for data transmission on the downlink and/or uplink.

In a wireless communication network, a base station may communicate with a UE in an uplink direction and a downlink direction. Sidelink communications were introduced in LTE to allow a UE to send data to another UE without tunneling through the base station and/or an associated core network. The LTE sidelink technology had been extended to provision for device-to-device (D2D) communications, vehicle-to-everything (V2X) communications, and/or cellular vehicle-to-everything (C-V2X) communications. Similarly, 5G NR may be extended to support sidelink communications, D2D communications, V2X communications, and/or C-V2X over licensed bands and/or unlicensed bands.

Sidelink communications can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through the base station (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. A sidelink UE may operate as a transmitting sidelink UE at one time and as a receiving sidelink UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving base station may determine radio resources on behalf of a sidelink UE and transmit an indication of the radio resources to the sidelink UE. The mode-2 RRA supports autonomous RRA that can be used for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communication.

For mode-2 RRA, a sidelink UE may perform sensing in a sidelink resource pool. The sensing may include decoding SCI and/or measuring signal energy in the channel. For SCI decoding, the UE may blindly decode SCI from a PSCCH of each resource. If the decoding is successful, the UE may record the decoded SCI. For signal measurements, the UE may receive a signal from each resource and compute a reference signal received power (RSRP) and/or receive signal strength indicator (RSSI) for each resource. The UE may also record the signal measurements. The UE may generate a packet (e.g., a medium access control (MAC), packet data unit (PDU)) for transmission. Upon generating the packet, the UE may trigger a resource selection. The UE may define a sensing window and a resource selection window in the resource pool with respect to a time when the resource selection is triggered. The sensing window may be located prior to the trigger, and the resource selection window may be located after the trigger. The UE may determine the sensing window and the resource selection window based on a set of parameters, which may be preconfigured and/or predetermined).

The UE may identify candidate resources within the resource selection window based on past sensing results (e.g., decoded SCI and/or signal measurements) obtained in the sensing window. In other words, the UE may predict resource usages in the resource selection window based on the past sensing results. The UE may randomly select a resource from the identified candidate resources. The UE may transmit a sidelink transmission (e.g., including SCI in a PSCCH and the packet in a PSSCH) using the selected resource. In some instances, the UE may select multiple resources from the candidate resources, for example, a first resource for an initial transmission of the packet and a second resource for a retransmission of the packet when hybrid automatic repeat request (HARQ) is used for the packet transmission.

Figure 3:
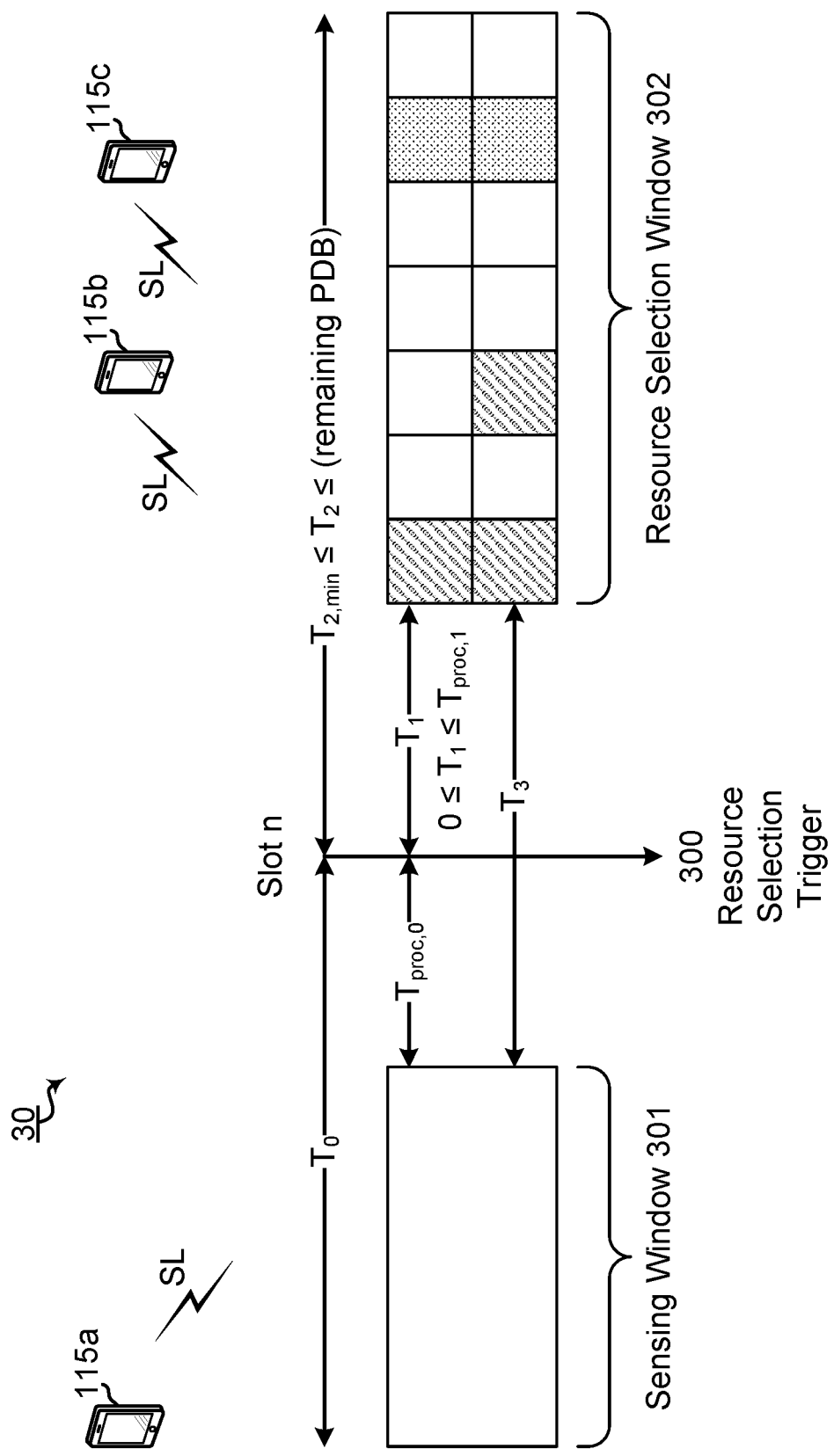
FIG. 3 is a block diagram illustrating an example NR-U network configured for sidelink communications between any one or more of UEs.

FIG. 3 is a block diagram illustrating an NR-U network 30 configured for sidelink communications between any one or more of UEs 115a-115c. An available set of resources for sidelink communications is identified at slot n. With identification of such resources of slot n, a sidelink transmitting UE, such as UE 115a, may define sensing window 301 prior to resource selection trigger 300, and resource selection window 302 after resource selection trigger 300. When a resource selection is triggered at slot n, resource selection trigger 300, UE 115a physical (PHY) layer may examine the shared spectrum during sensing window 301 to identify the set of candidate resources in resource selection window 302 and reports to the medium access control (MAC) layer of UE 115a. Specifically, $T_1$ is a UE implementation value being not larger than $T_{proc,1}$. represents the processing time for UE 115a for any detected signals during sensing window 301 and preparation for transmission in one or more of the selected sidelink candidate resources of resource selection window 302. Among the candidate resources reported by the PHY layer of UE 115a, the MAC layer of UE 115a would then randomly select one or more of the candidate resource blocks of resource selection window 302 for transmission.

It should be noted that where the intended sidelink communications with reservation for hybrid automatic receipt request (HARQ) retransmission, the sidelink transmission resources for multiple PSSCHs for the same transport block (TB) may be randomly selected by the MAC layer of UE 115a as well.

In addition, a NR sidelink transmitting UE, such as UE 115a, with 5G NR operations in mode-2 would continuously sense channel up to $T_3$ before the actual TX selected (referred to as "last-minute re-evaluation"). The MAC layer of UE 115a may request the PHY layer to update available resources at this instant to double check whether the coming resource, as well as other reservations in the future, are still available. The PHY layer of UE 115a responds to the MAC layer regarding all available resources at this instant and, if the resource for the coming PSSCH is not available anymore, UE 115a sets the re-selection flag to the MAC layer. After receiving this flag, the MAC layer of UE 115a will randomly re-select a resource from available candidate resource sets of resource selection window 302. This may lead to a new $T_3$ based the re-evaluation. Otherwise, the PHY layer of UE 115a may expect to transmit over the pre-selected sidelink resource.

In a first optional implementation of an LBT aware resource selection window, a delayed resource selection may be triggered based on a contention window of the CAT 4 LBT. In a second operation implementation, the resources in the resource selection window, which may be blocked by the CAT 4 LBT procedure may be excluded.

Figure 4:
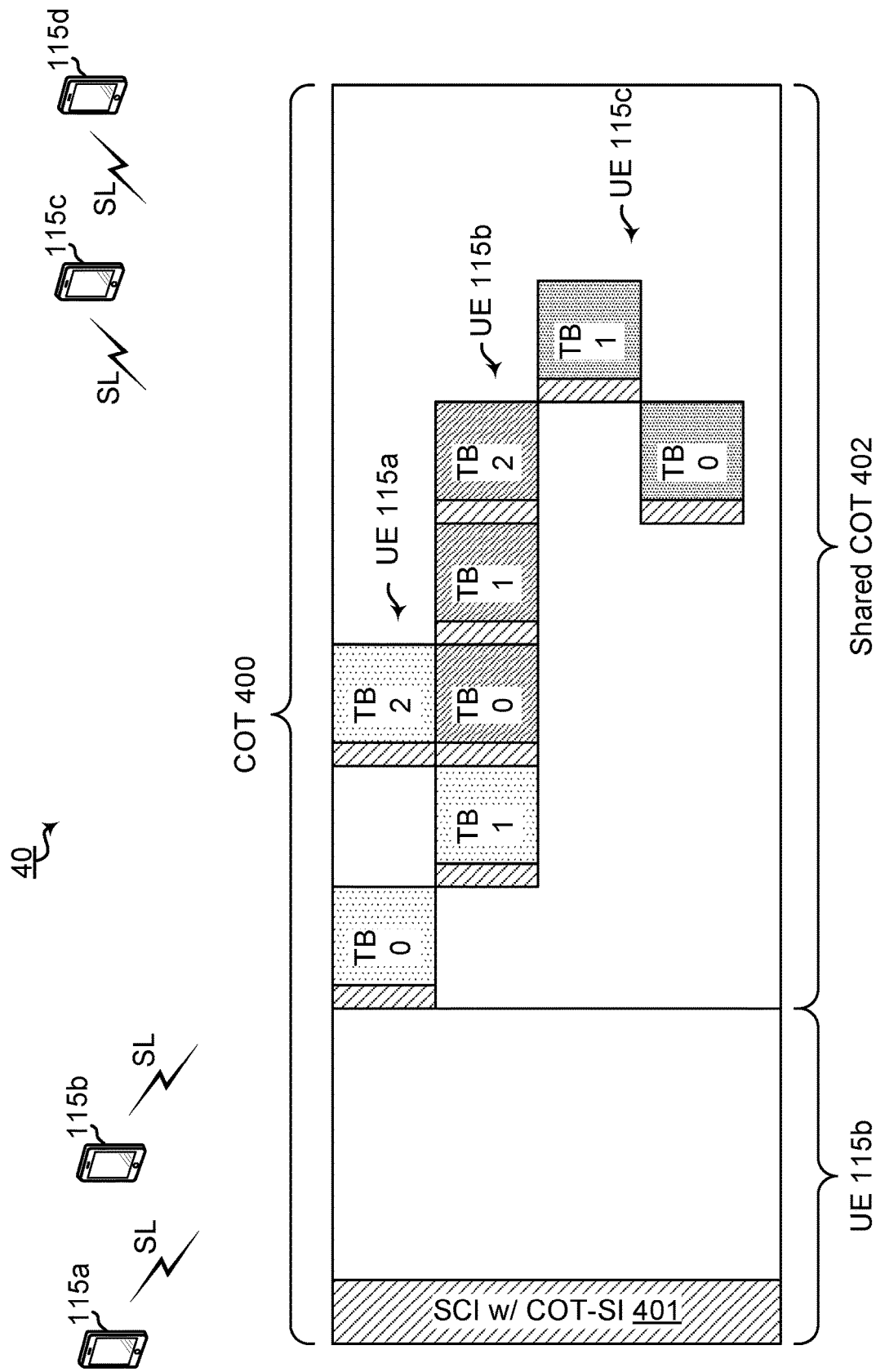
FIG. 4 is a block diagram illustrating an example NR-U network configured for slidelink COT sharing between one or more of UEs.

FIG. 4 is a block diagram illustrating NR-U network 40 configured for slidelink COT sharing between one or more of UEs 115a-115d. In NR-U network 40, COT sharing from an UE to base station is possible in configure grant. The UE would transmit a group common-uplink control information (GC-UCI) that indicates the starting point and duration of the remaining COT to share with the base station. The base station would occupy the remaining portion of the COT immediately or within a short gap (e.g., 16 µs to 25 µs) after the last UE transmission. Prior to transmitting, the base station would conduct an abbreviated LBT procedure, such as a CAT 1 or CAT 2 LBT.

COT sharing has also been suggested in sidelink communications. The sideline control information (SCI) message may be considered to include a COT sharing grant from the COT-sharing initiating node. For example, UE 115b performs a CAT 4 LBT to secure COT 400. UE 115b transmits COT-sharing information (COT-SI) 401 message that includes an SCI message including sufficient information regarding a shared COT region 402 of COT 400 for the eligible sidelink COT sharing nodes, UEs 115a, 115c, and 115d. The eligibility may be based on a distance metric, priority, and the like. UEs 115a, 115c, and 115d will take the SCI included in COT-SI 401 as a grant for sharing COT 400 and may select available resources for transmission within the shared COT region 402 after an abbreviated LBT procedure (e.g., CAT 1 or CAT 2 LBT).

It should be noted that any transmissions from the eligible sidelink COT sharing nodes, UEs 115a, 115c, and 115d, may extend up to the end of COT 400 with no transmission gap limits. COT sharing nodes, UEs 115a, 115, and 115d, can start transmissions at selected resource blocks within shared COT region 402 even if there is a gap larger than 25 μs between the end of the COT initiating device's, UE 115*b*'s, last transmission. It should further be noted that, in such a scenario, there is a possibility that another radio access technology (RAT) transmitter may occupy the shared resources where there is a large gap (>25 μs), which could cause LBT failure and resource reselection.

In such existing scenarios associated with sidelink COT sharing, a question may exist as to how the MAC layer of the sidelink transmitting UE knows the resource candidates in a legacy resource selection window are located within a shared COT region (referred to as "in-COT") or outside of a COT (referred to as "out-COT"). For resources outside of a COT, some of the resources may be excluded based on the projected time for a CAT 4 LBT procedure. In certain aspects, different LBT parameters may be associated with certain available resources. Various aspects of the present disclosure are related to COT-SI sensing for the available resources in the resource selection window before resource selection.

Figure 5:
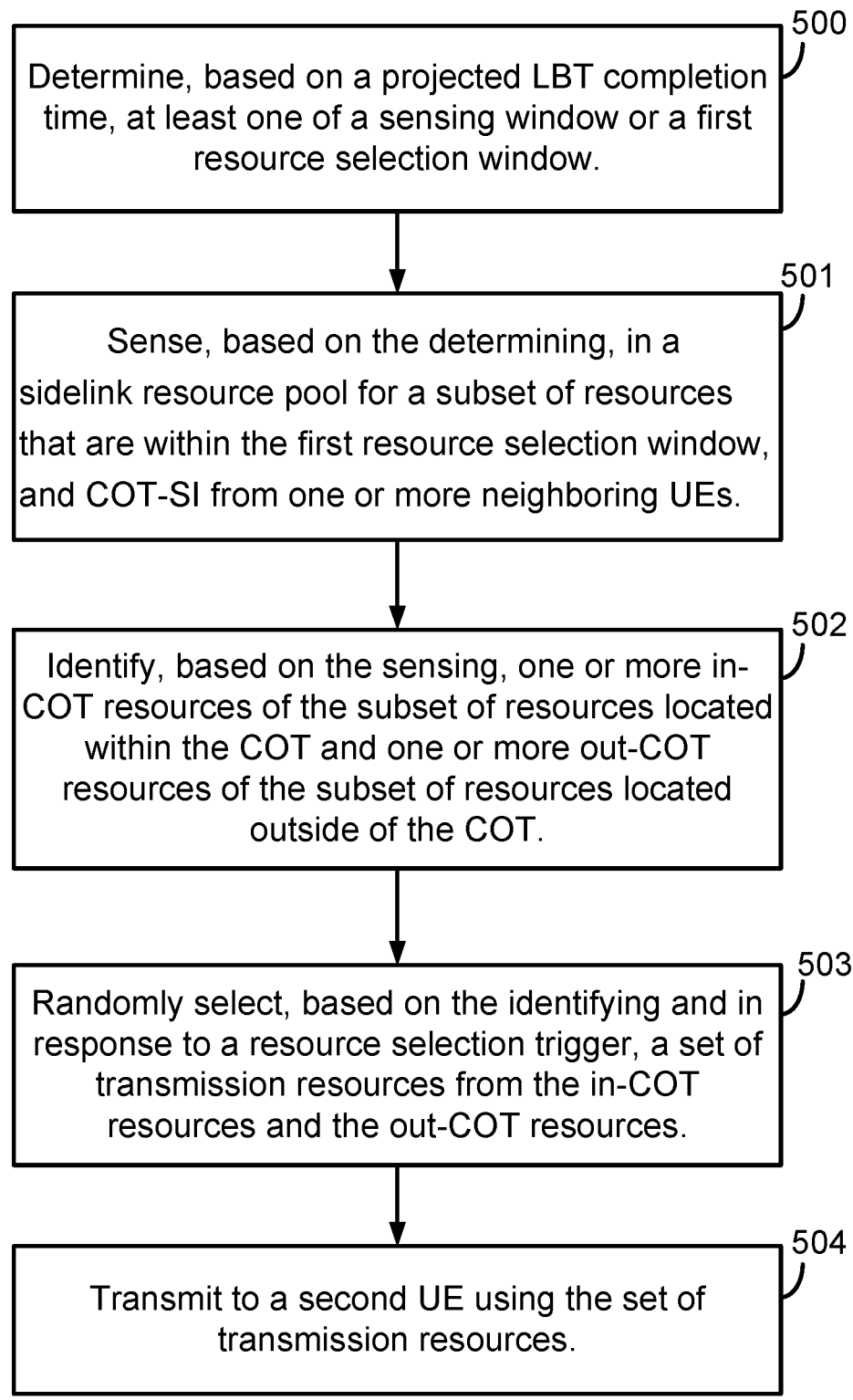
FIG. 5 is a block diagram illustrating example blocks executed by a UE configured for COT aware sensing and resource selection according to one aspect of the present disclosure.
Figure 11:
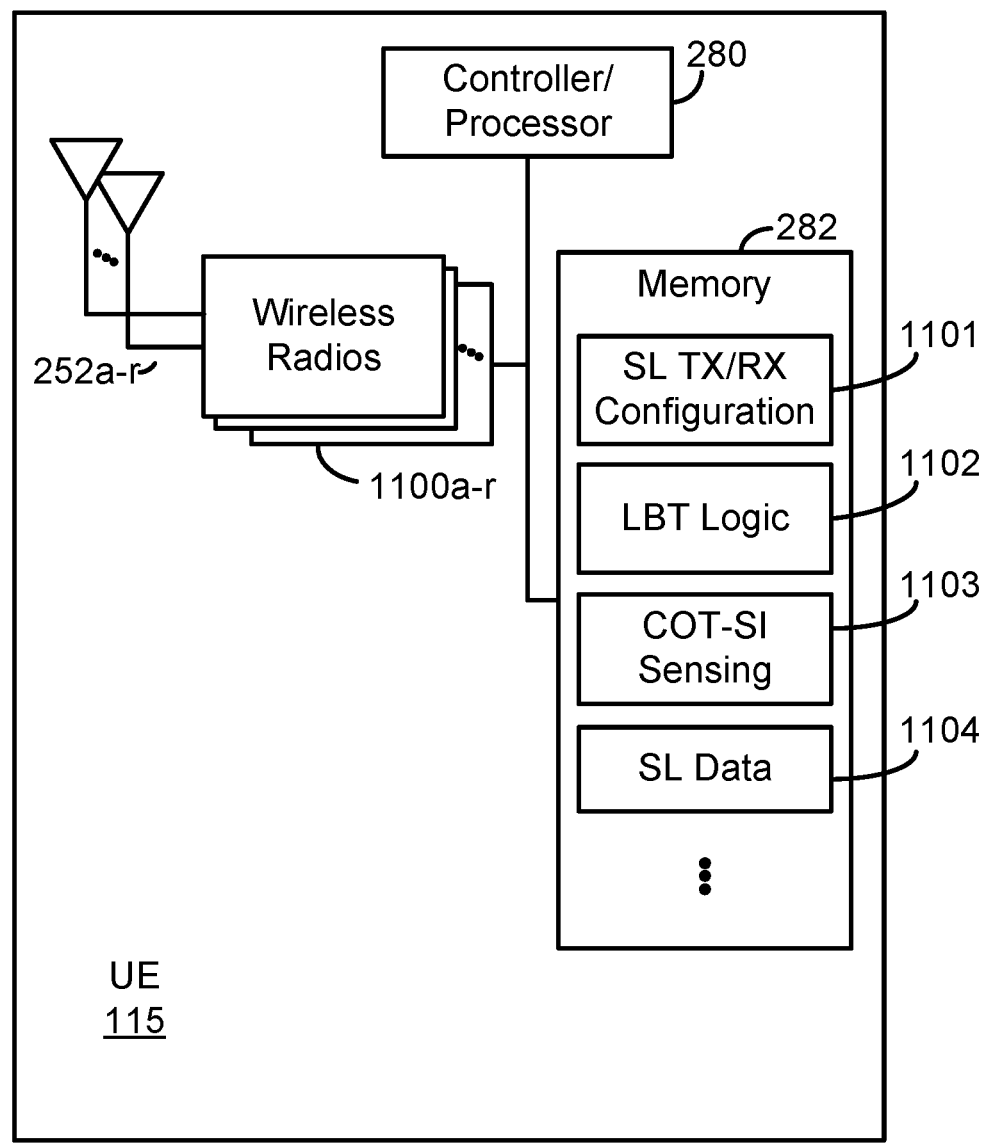
FIG. 11 is a block diagram illustrating an example UE configured for COT aware sensing and resource selection according to one aspect of the present disclosure.

FIG. 5 is a block diagram illustrating example blocks executed by a UE for COT-aware sensing and resource selection in a NR-U network according to one aspect of the present disclosure. The example blocks will also be described with respect to UE 115 as illustrated in FIGS. 2 and 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100*a-r* and antennas 252*a-r*. Wireless radios 1100*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 500, a UE determines, based on a projected LBT completion time, at least one of a sensing window or a first resource selection window. A sidelink transmitting UE, such as UE 115, may execute sidelink transmission/reception (TX/RX) configuration 1101, stored in memory 282, under control of controller/processor 280. Sideline TX/RX configuration 1101 includes logic and instructions that, when executed, enables sidelink communication functionality with a compatible network, such as an NR-U network. The execution of the steps and logic that enables such functionality of UE 115 is referred to as the "execution environment" of sidelink TX/RX configuration 1101. Within the execution environment of sidelink TX/RX configuration 1101, UE 115 identifies sideline data 1104 that it desires to transmit via sidelink resources to a neighboring UE.

In preparation for this sidelink transmission, UE 115, under control of controller/processor 280, executes LBT logic 1102. The execution environment of LBT logic 1102 enables the functionality for UE 115 to perform various types of LBT procedure, as appropriate. In order to initial communications, UE 115 may project a completion time of an LBT procedure, within the execution environment of LBT logic 1102. Further within the execution environment of sidelink TX/RX configuration 1101, UE 115 defines a sensing region and a resource selection window of available sidelink resources for its transmission of sidelink data 1104.

At block 501, the UE senses, based on the determining, in a sidelink resource pool within a shared communication band for a subset of resources from the sidelink resource pool that are within the first resource selection window, and COT-SI from one or more neighboring UEs, wherein the COT-SI includes identification of a COT initiated by the one or more neighboring UEs and one or more parameters associated with the COT. Within the execution environment of sidelink TX/RX configuration 1101, UE 115 may sense, using signals received via antennas 252*a-r* and wireless radios 1100*a-r*, a pool of sidelink resources with a shared resource band of the resource selection window. UE 115 may further sense for COT-SI that may include information regarding a COT initiated by a neighboring UE which may offer a shared COT region overlapping with the resource selection window.

At block 502, the UE identifies, based on the sensing, one or more in-COT resources of the subset of resources located within the COT and one or more out-COT resources of the subset of resources located outside of the COT. Within the execution environment of sidelink TX/RX configuration 1101, as UE 115 senses and detects any COT-SI, UE 115 may selected one or more resources of the resource selection window that may be in-COT, within an identified shared COT region, and/or out-COT, outside of a COT.

At block 503, the UE randomly selects, based on the identifying and in response to a resource selection trigger, a set of transmission resources from one of more of the one or more in-COT resources and the one or more out-COT resources. As available in-COT and/or out-COT resources are identified, UE 115, within the execution environment of sidelink TX/RX configuration 1101, may randomly select a set of transmission resources.

At bloc 504, the UE transmits to a second UE using the set of transmission resources. Under control of controller/processor 280, UE 115 may then transmit sidelink data 1104 to the intended neighboring UE via wireless radios 1100*a-r* and antennas 252*a-r* according to the set of selected transmission resources.

Additional aspects of the present disclosure may define different types of effective resource selection window within a legacy RSW that includes the resources inside the shared COT region and outside of the COT, respectively. A type-0 effective resource selection window may be defined with resource blocks inside of the shared COT region, while a type-1 effective resource selection window may be defined with resource block outside of the COT. The type-1 effect resource selection window may also exclude resources across the performance of the CAT 4 LBT procedure (referred to herein as the "dead zone" for CAT 4 count down). Resource selection on either the type-0 or type-1 effective resource selection windows, if both are available, may be based on an LBT success rate. That is, where a higher LBT success rate is noted for type-0 vs. type-1, the sidelink transmitting UE may select available resources where the higher LBT success rate is experienced.

Additional aspects may provide for post resource selection trigger sensing for COT-SI, such that, where it is later found that resource blocks excluded as being within a CAT 4 LBT dead zone, are within a shared COT region, those resource blocks may be made available again. As the character of the resource block (e.g., in COT or out COT) may change after initial selection, the applicable LBT type for a type-1 effective resource selection window resource may be updated to allow an abbreviated LBT procedure.

The SCI message may carry COT-SI which contains the COT information, such as start/end of the UE's COT, an offset and duration of the shared COT region, channel access priority class (CAPC), energy detection (ED) threshold, and the like. The MAC layer of the sidelink transmitting UE should know whether resources in the resource selection window are in-COT or out-COT. In order to provide such information, the PHY layer of the sidelink transmitting UE may sense for COT-SI.

Figure 6:
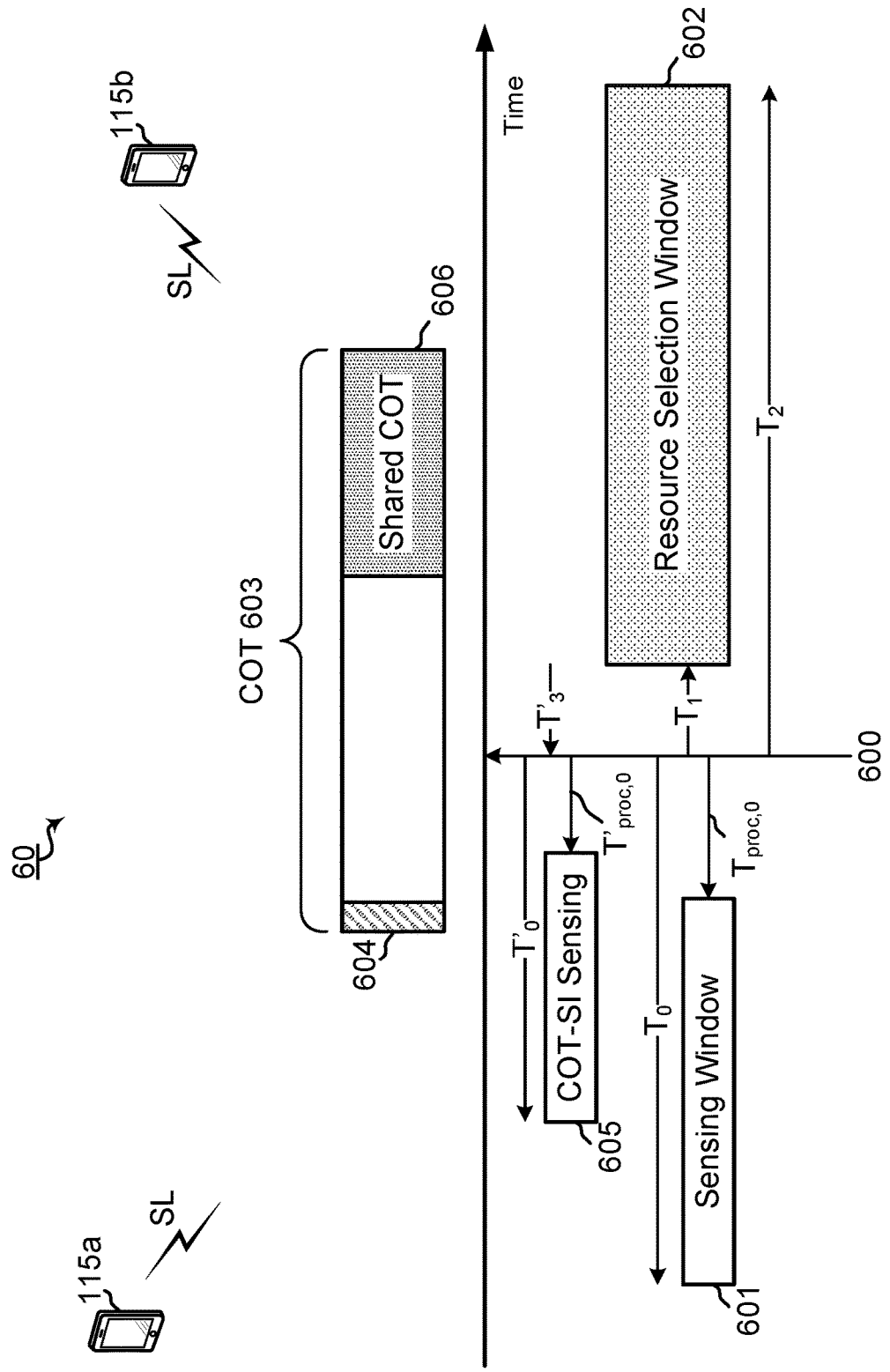
FIG. 6 is a block diagram illustrating an example NR-U network with UEs configured for COT aware sensing and resource selection according to one aspect of the present disclosure.

FIG. 6 is a block diagram illustrating an NR-U network 60 with UEs 115a and 115b configured for COT aware sensing and resource selection according to one aspect of the present disclosure. Upon resource selection trigger 600, UE 115a examines if resources within resource selection window 602 are within the UE 115a's own COT or other UE's COT, such as UE 115b. UE 115a may examine for resource SCI messages within sensing window 601 to determine if the resources within resource selection window 602 are reserved. UE 115a may perform the COT-SI sensing within sensing window 601 upon receiving resource selection trigger 600. However, in an additional aspect of the present disclosure, UE 115a may perform the COT-SI sensing in COT-SI sensing window 605, which may start from n−$T'_0$ or n−$T'_{proc,0}$ before the trigger at n, where $T'_0 \leq T_0$ and $T'_{proc,0} \leq T_{proc,0}$.

UE 115a may detect COT-SI 604 from UE 115b identifying COT 603 and a shared COT region 606. COT-SI 605 may indicate the UE 115b's own COT, COT 603, or shared COT region 606 within the same COT and COT duration≤10 ms. After resource selection trigger 600, the MAC layer of UE 115a will request the PHY layer of UE 115a to provide the COT-SI sensing results.

When a UE initiates its own COT with a CAT 4 LBT procedure, some of the resources within a resource selection window may be excluded as being located within the dead zone of the CAT 4 LBT procedures. However, some of these resources in the resource selection window could be detected to be in other UE's shared COT region and, therefore, may not be excluded from available resources. Within the shared COT region, the earliest resources may be less susceptible to LBT blocking from other RAT transmissions, as COT sharing UEs may leave transmission gaps, as sidelink scheduling within the resource selection window is random. Additional aspects of the present disclosure may provide for finer control of scheduling across "in-COT" resources.

Figure 7:
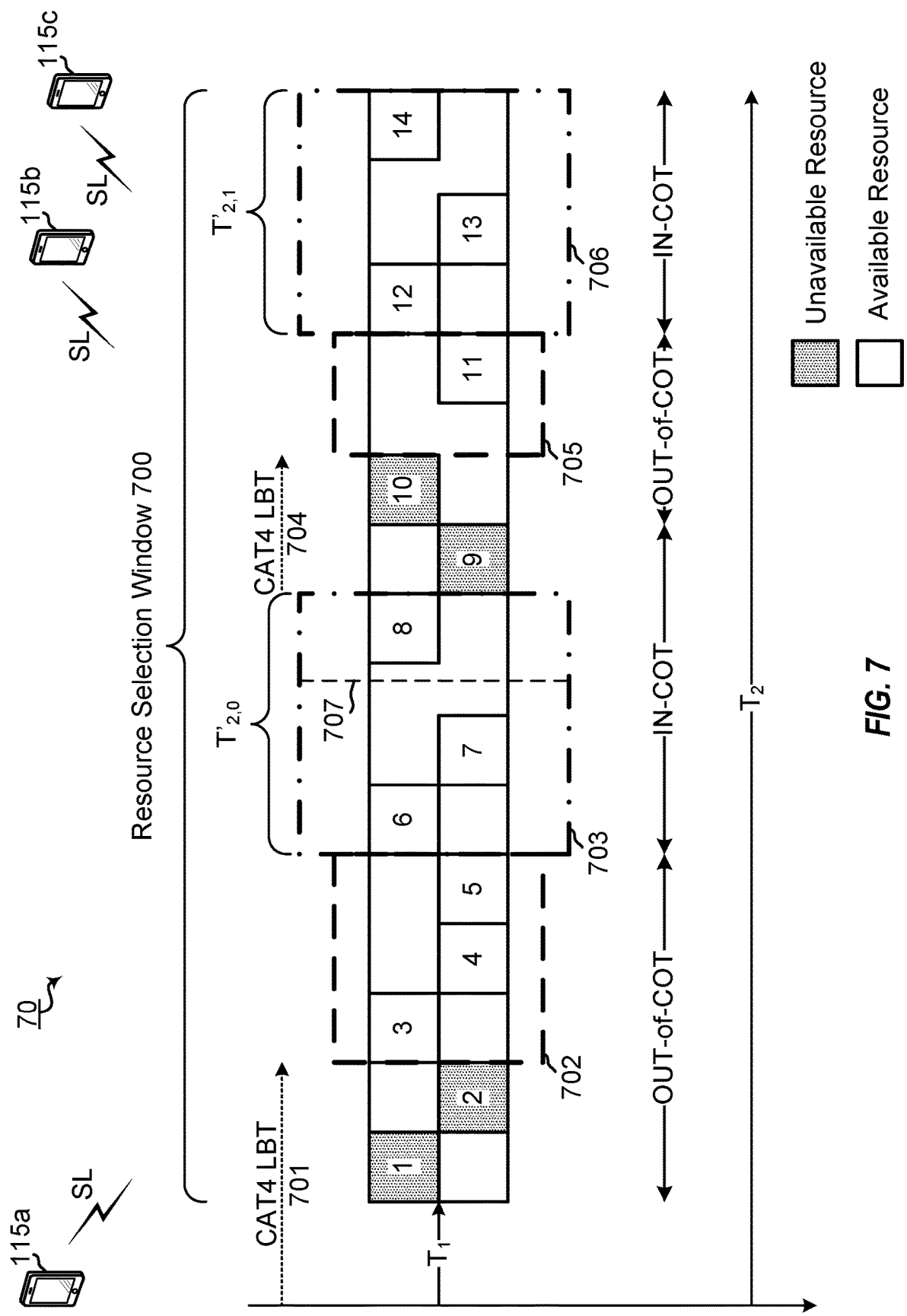
FIG. 7 is a block diagram illustrating an example NR-U network with UEs configured for COT aware sensing and resource selection according to one aspect of the present disclosure.

FIG. 7 is a block diagram illustrating an NR-U network 70 with UEs 115a-115c configured for COT aware sensing and resource selection according to one aspect of the present disclosure. When determining the availability of resources with resource selection window 700, UE 115a may create multiple effective resource selection windows based on a type of resource (e.g., type-0 includes in-COT resources, type-1 includes out-COT resources). For example, UE 115a detects COT-SI that identifies shared COT regions from UE 115b and UE 115c. The detected shared COT regions allow UE 115a to define type-0 effective resource selection windows 703 and 706, within resource selection window 700. Effective resource selection windows 703 and 706 include resource blocks 6-8 and 12-14, respectively, that are in-COT. Resource blocks 1-5 and 9-11 are out-COT resource blocks. In determining a projected LBT completion time (CAT 4 LBTs 701 and 704), however, UE 115a excludes resource blocks 1, 2, 9, and 10, thus, defining type-1 effective resource selection windows 702 and 705 including out-COT resource blocks 3-5 and 11, respectively. UE 115a may then randomly select resource blocks across any of type-1 effective resource selection windows 702 and 705 and type-0 effective resource selection windows 703 and 706.

Additional aspects of the present disclosure may provide for the length of type-0 effective resource selection windows, such as effective resource selection windows 703 and 706 ($T'_{2,0}$ and $T'_{2,1}$) to be adjustable to allow the sidelink scheduler to restrict resource selection to the earlier resources of the shared COT region. Thus, when defining type-0 effective resource selection windows 703 and 706, UE 115a may determine to exclude later resource blocks, such as resource block 8 from type-0 effective resource selection window 703 by reducing $T'_{2,0}$ to end at time 707. Because of the gap between resource block 7 and resource block 8, there is a higher chance that another RAT transmission may occupy the shared resources any block any sidelink scheduled transmissions for resource block 8.

In another example aspect, $T'_{2,x}$ may be a function of LBT success rate in the shared COT region. The LBT success rate may capture inter-RAT interference when the success rate drops. Thus, UE 115a may project the LBT successful rate in current effective resource selection windows from previous COTs. For example, WiFi interference could arise within the transmission gap between resource block 7 and resource block 8, which, as noted above, may block sidelink transmissions in resource block 8 due to failure of the abbreviated LBT procedure. By reducing $T'_{2,1}$ to time 707 when UE 115a determines a lower LBT success rate over the original $T'_{2,1}$, UE 115a may select among resource blocks 6 and 7, which may increase the LBT successful rate over the original $T'_{2,1}$ of type-0 effective resource selection window 703.

It should be noted that the LBT success rate for a given region or set of resources may be maintained by each sidelink UE, such as UEs 115a-115c, based on transmission experience in prior COTs. Additional or alternative aspects may provide for sidelink UEs, such as UEs 115a-115c to share LBT success rates among communicating UEs.

Figure 8:
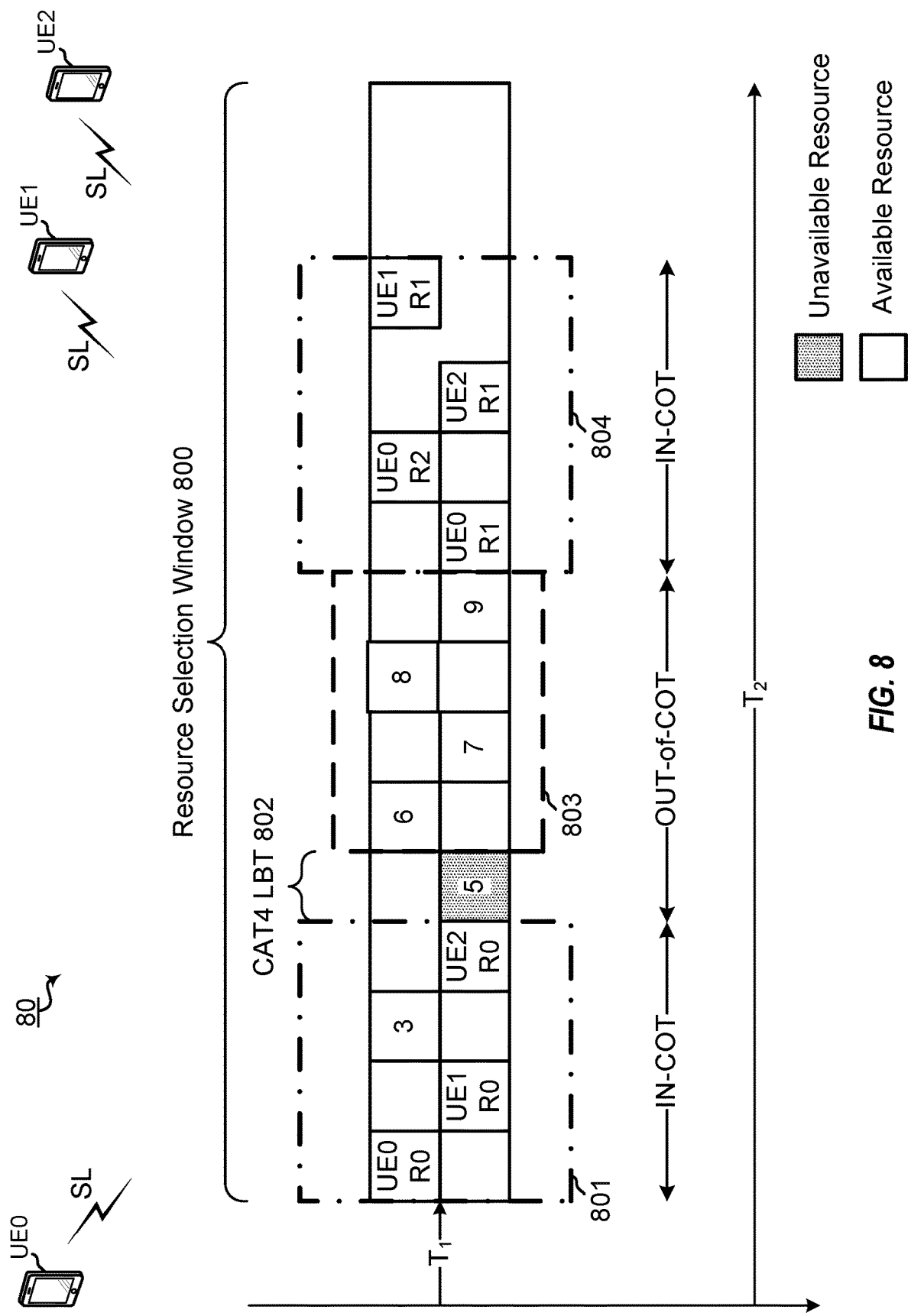
FIG. 8 is a block diagram illustrating an example NR-U network with UEs configured for COT aware sensing and resource selection according to one aspect of the present disclosure.

FIG. 8 is a block diagram illustrating an NR-U network 80 with UE0-2 configured for COT aware sensing and resource selection according to one aspect of the present disclosure. When determining the availability of resources with resource selection window 800, UE0 may create multiple effective resource selection windows based on a type of resource (e.g., type-0 includes in-COT resources, type-1 includes out-COT resources). For example, UE0 detects COT-SI that identifies shared COT regions from UE1 and UE2. The detected shared COT regions allow UE0 to define type-0 effective resource selection windows 801 and 804 and type-1 effective resource selection window 803, excluding resource block 5, because of the project completion of CAT 4 LBT 802, and including resource blocks 6-9.

Type-0 effective resource selection windows 801 and 804 and type-1 effective resource selection window 803 may have different channel access or LBT success rates. For out-COT segments within type-1 effective resource selection window 803, CAT 4 LBTs may have a higher failure rate compared with the abbreviated LBTs (e.g., CAT 2/1 LBT) in type-0 effective resource selection windows 801 and 804. An LBT failure would trigger resource reselection into later resources, which may be less desirable, as later resources may be reserved by other UEs. For example, if the LBT for UE0 R0 fails in type-0 effective resource selection window 801 and UE0 reselects for retransmission in out-COT resources of type-1 effective resource selection window 803, such as in resource block 8, the retransmission of UE0 in resource block 8 may not clear the CAT 4 LBT, which may further trigger resource reselection. However, if the later in-COT resources of type-0 effective resource selection window 804 have already been reserved by UE1-UE2, The transport block (TB) of UE0 may be lost.

To avoid such circumstances, when UE0 determines the CAT 4 LBT failure rate over type-1 effective resource selection window 803, UE0 may select resource candidates with higher priority on type-0 effective resource selection windows 801 and 805 within the packet delay budget (PDB) of the TB. UE0 may prefer scheduling resources on type-0 effective resource selection windows within the PDB even when the type-0 resources are located after the type-1 resources, such as the resources of type-0 effective resource selection window 804 after resource blocks 6-9 of type-1 effective resource selection window 803.

In the above example, UE0 may want to schedule R1/R2 in the type-0 effective resource selection window 804 within the PDB at R0 initially in type-0 effective resource selection window 801. Even though the resources for UE0 R1/R2 in type-0 effective resource selection window 804 comes later than resource blocks 6-9 of type-1 effective resource selection window 803, they comes with a higher channel access rate. Therefore, UE0 reserves RR1/RR2 in type-0 effective resource selection window 804 when initially performing resource selection.

Figure 9:
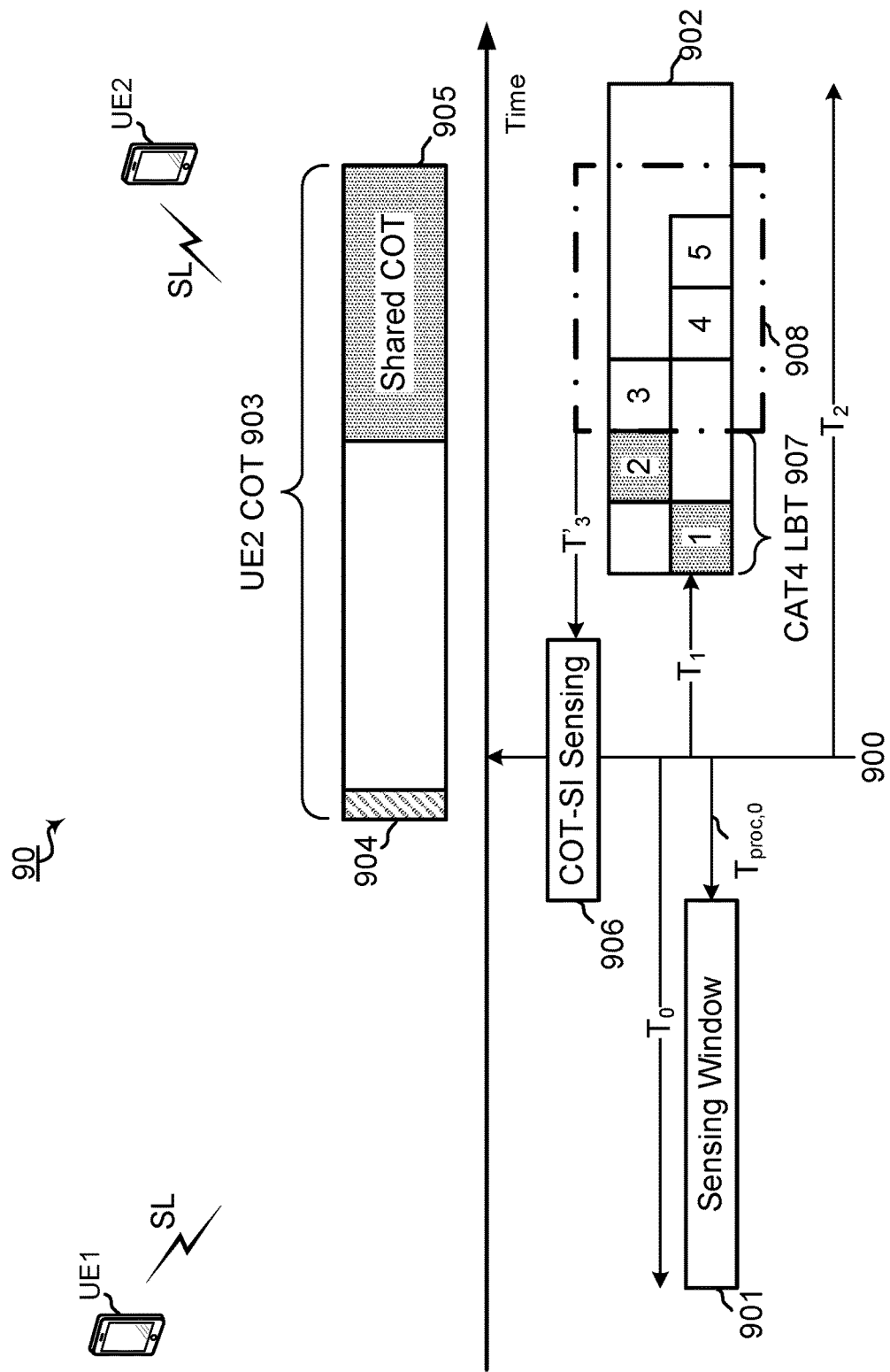
FIG. 9 is a block diagram illustrating an example NR-U network with UEs configured for COT aware sensing and resource selection according to one aspect of the present disclosure.

FIG. 9 is a block diagram illustrating an NR-U network 90 with UE1-2 configured for COT aware sensing and resource selection according to one aspect of the present disclosure. When determining the availability of resources with resource selection window 902, UE1 may create type-0 effective resource selection window 908 with resource blocks 3-5 within shared COT region 905 of UE2 COT 903. UE1 would continue sensing for COT-SI in COT-SI sensing region 906 after sensing window 901. When UE1 detects COT-SI 904 that identifies shared COT region 905 from UE2, it defines type-0 effective resource selection windows 908. UE1 does not identify a type-1 effective resource selection window because the projected completion of CAT 4 LBT 907 would cause exclusion of resource blocks 1 and 2. UE1 may sense the shared channel in COT-SI sensing region 906 up to T'$_3$ before the actual transmission selected within type-0 effective resource selection window 908. T'$_3$ may depend on the COT-SI processing timeline.

Figure 10:
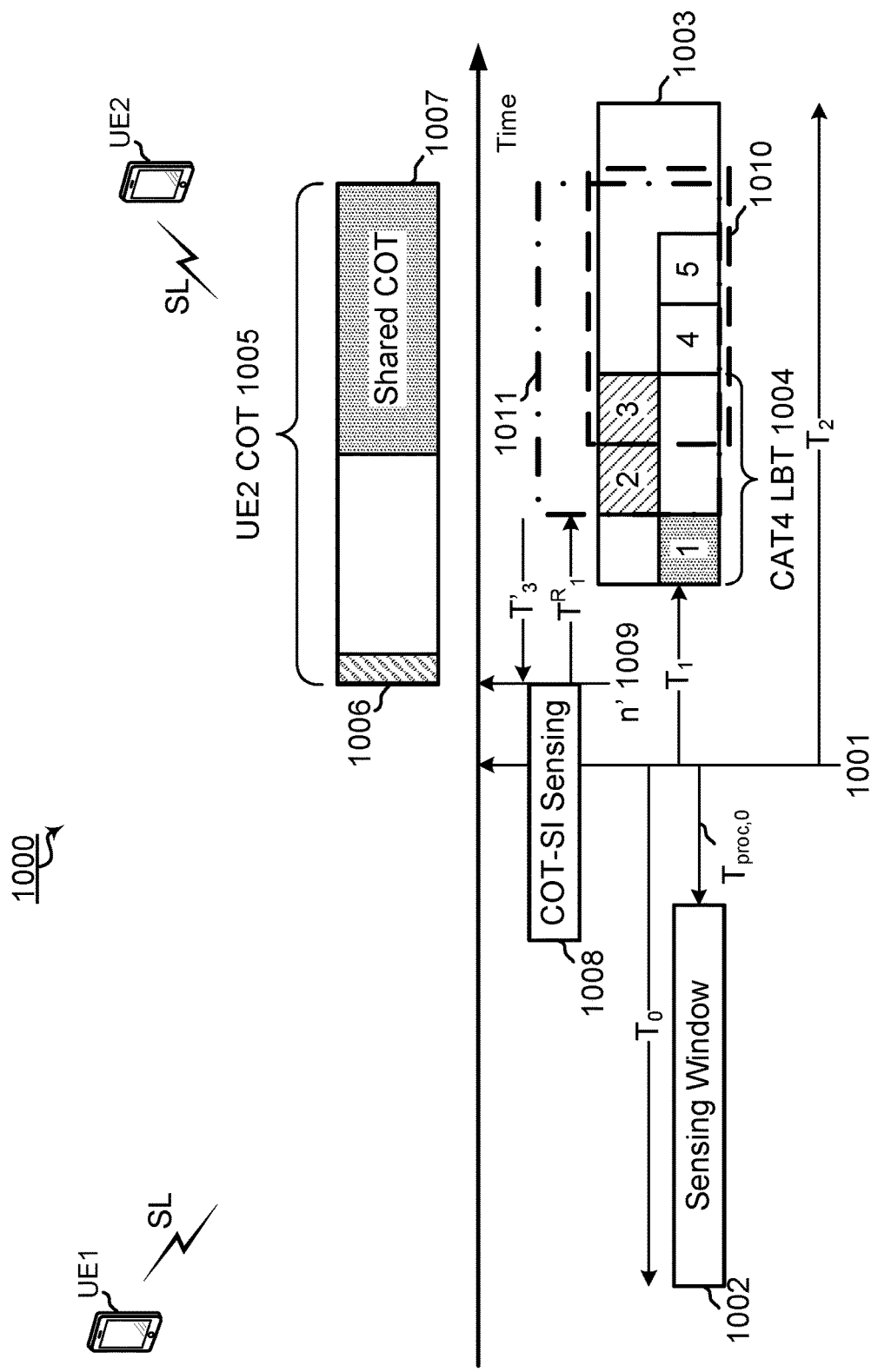
FIG. 10 is a block diagram illustrating an example NR-U network with UEs configured for COT aware sensing and resource selection according to one aspect of the present disclosure.

FIG. 10 is a block diagram illustrating an NR-U network 1000 with UE1-2 configured for COT aware sensing and resource selection according to one aspect of the present disclosure. When determining the availability of resources with resource selection window 1003, UE1 senses within sensing window 1002 for any COT-SI. As resource selection trigger 1001 arrives, UE1 defines a single type-1 effective resource selection window 1010, which excludes resource blocks 1-2 as falling within the dead zone of CAT 4 LBT 1004. UE1 may then randomly select from resource blocks 3, 4, and 5 for out-COT sidelink transmission using a CAT 4 LBT procedure before transmission.

After resource selection trigger 1001, UE1 may continue sensing of the shared channel in COT-SI sensing region 1008. At n' 1009, UE1 detects COT-SI 1006 from UE2 that defines UE2 COT 1005 and shared COT region 1007. As UE1 detects a new in-COT region based on shared COT region 1007 of UE2, UE1 may reselect resources within $T^R_1$ from 1009 to the first possible transmission at resource block 2 in a new effective resource selection window rom n'+$T^R_1$ to n'+$T_2$ if necessary. UE1 may define a new type-0 effective resource selection window 1011 that includes resource blocks 2-5. If UE1 detects resource blocks 2 and 3, which are now in-COT, are before T'$_3$, the LBT parameters in can be updated. For example, resource block 3 was previously available under CAT 4 LBT. However, once resource block 3 is determined to be in-COT, it may be available under an abbreviated LBT procedure.

The original type-1 effective resource selection window 1010 excluded the out-COT resources within the dead zone of CAT 4 LBT 1004, resource blocks 1 and 2, which are then not usable and wasted. However, where shared COT region 1007 is identified after resource selection trigger 1001 and any of the dead zone resources, resource blocks 1 and 2, are within shared COT region 1007, UE1 may convert those dead zone resources to usable resources. As illustrated in FIG. 10, UE1 determines that previous dead zone resource, resource block 2, is now within the type-0 effective resource selection window 1011 and available for random selection by UE1. UE1 may now move allocation for delay sensitive TBs from later resources (e.g., resource block 4 or 5) to the previous dead zone resources (e.g., resource block 2) in effective resource selection window 1011.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5 may comprise processors, electronics devices, hardware devices, electronics components, logical circuits, memories, software codes, firmware codes, etc., or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. An example first aspect configured for wireless communication performed by a first UE includes determining, based on a LBT completion time, at least one of a sensing window or a first resource selection window; sensing, based on the determining, in a sidelink resource pool within a shared communication band for: a subset of resources from the sidelink resource pool that are within the first resource selection window, and COT-SI from one or more neighboring UEs, wherein the COT-SI includes identification of a COT initiated by the one or more neighboring UEs and one or more parameters associated with the COT; identifying, based on the sensing, one or more in-COT resources of the subset of resources located within the COT and one or more out-COT resources of the subset of resources located outside of the COT; randomly selecting, based on the identifying and in response to a resource selection trigger, a set of transmission resources from one of more of the one or more in-COT resources and the one or more out-COT resources; and transmitting to a second UE using the set of transmission resources.

A second aspect, based on the first aspect, wherein the sensing for the COT-SI includes one of: sensing for the COT-SI during a COT-SI sensing window located a predetermined duration prior to the resource selection trigger; or sensing for the COT-SI in response to the resource selection trigger.

A third aspect, based on the first aspect, wherein the identifying the one or more in-COT resources and one or more out-COT resources include defining one or more first type ERSWs including one or more sets of the one or more in-COT resources, wherein the one or more first type ERSWs may be located one of within the COT or over the COT and one or more additional COTs; defining one or more second type ERSWs including one or more sets of the one or more out-COT resources.

A fourth aspect based on the third aspect, wherein the defining the one or more first type ERSWs includes adjusting, by the first UE, a length of at least one first type ERSW of the one or more first type ERSWs to exclude any of the one or more in-COT resources located within a predetermined threshold of an ending boundary of one of the COT or the COT and the one or more additional COTs.

A fifth aspect, based on the third aspect, further including determining, by the first UE, that one or more initial resources of one of the one or more out-COT resources or each second type ERSW of the one or more second type ERSWs falls before the projected LBT completion time; and excluding the one or more initial resources from the one of the one or more out-COT resources or the each second type ERSW of the one or more second type ERSWs.

A sixth aspect, based on the third aspect, further including identifying, by the first UE, a failure rate of a full LBT procedure associated with a location of the first UE, wherein the randomly selecting the set of transmission resources includes randomly selecting the set of transmission resources from the one or more in-COT resources within a packet delay budget of a corresponding transmission packet and refraining from randomly selecting from the one or more out-COT resources.

A seventh aspect, based on the third aspect, wherein the sensing for the COT-SI further includes continued sensing, after the randomly selecting, for the COT-SI until a threshold COT-SI processing time prior to the set of transmission resources.

An eighth aspect, based on the seventh aspect, further including detecting, based on the continued sensing, a subsequent COT-SI indicating that one or more identified resources of the one or more out-COT resources is located in another COT of the one or more neighboring UEs; and re-identifying, based on the detecting, the one or more identified resources to the one or more in-COT resources.

A ninth aspect may include a first UE configured for wireless communication which may include means for determining, based on a projected LBT completion time, at least one of a sensing window or a first resource selection window; means for sensing, based on the means for determining, in a sidelink resource pool within a shared communication band for a subset of resources from the sidelink resource pool that are within the first resource selection window, and COT-SI from one or more neighboring UEs, wherein the COT-SI includes identification of a COT initiated by the one or more neighboring UEs and one or more parameters associated with the COT; means for identifying, based on the means for sensing, one or more in-COT resources of the subset of resources located within the COT and one or more out-COT resources of the subset of resources located outside of the COT; means for randomly selecting, based on the means for identifying and in response to a resource selection trigger, a set of transmission resources from one of more of the one or more in-COT resources and the one or more out-COT resources; and means for transmitting to a second UE using the set of transmission resources.

A tenth aspect, based on the ninth aspect, wherein the means for sensing for the COT-SI includes one of means for sensing for the COT-SI during a COT-SI sensing window located a predetermined duration prior to the resource selection trigger; or means for sensing for the COT-SI in response to the resource selection trigger.

An eleventh aspect, based on the ninth aspect, wherein the means for identifying the one or more in-COT resources and one or more out-COT resources include means for defining one or more first type ERSWs including one or more sets of the one or more in-COT resources, wherein the one or more first type ERSWs may be located one of within the COT or over the COT and one or more additional COTs; means for defining one or more second type ERSWs including one or more sets of the one or more out-COT resources.

A twelfth aspect, based on the eleventh aspect, wherein the means for defining the one or more first type ERSWs includes means for adjusting, by the first UE, a length of at least one first type ERSW of the one or more first type ERSWs to exclude any of the one or more in-COT resources located within a predetermined threshold of an ending boundary of one of the COT or the COT and the one or more additional COTs.

A thirteenth aspect, based on the eleventh aspect, further including means for determining, by the first UE, that one or more initial resources of one of the one or more out-COT resources or each second type ERSW of the one or more second type ERSWs falls before the projected LBT completion time; and means for excluding the one or more initial resources from the one of the one or more out-COT resources or the each second type ERSW of the one or more second type ERSWs.

A fourteenth aspect, based on the eleventh aspect, further including means for identifying, by the first UE, a failure rate of a full LBT procedure associated with a location of the first UE, wherein the randomly selecting the set of transmission resources includes means for randomly selecting the set of transmission resources from the one or more in-COT resources within a packet delay budget of a corresponding transmission packet and means for refraining from randomly selecting from the one or more out-COT resources.

A fifteenth aspect, based on the eleventh aspect, wherein the means for sensing for the COT-SI further includes means for continued sensing, after execution of the means for randomly selecting, for the COT-SI until a threshold COT-SI processing time prior to the set of transmission resources.

A sixteenth aspect, based on the fifteenth aspect, further including means for detecting, based on the continued sensing, a subsequent COT-SI indicating that one or more identified resources of the one or more out-COT resources is located in another COT of the one or more neighboring UEs; and means for re-identifying, based on the means for detecting, the one or more identified resources to the one or more in-COT resources.

A seventeenth aspect including a non-transitory computer-readable medium having program code recorded thereon, the program code may include program code executable by a computer for causing the computer to determine, based on a projected LBT completion time, at least one of a sensing window or a first resource selection window; program code executable by the computer for causing the computer to sense, based on the determination, in a sidelink resource pool within a shared communication band for a subset of resources from the sidelink resource pool that are within the first resource selection window, and COT-SI from one or more neighboring UEs, wherein the COT-SI includes identification of a COT initiated by the one or more neighboring UEs and one or more parameters associated with the COT; program code executable by the computer for causing the computer to identify, based on the sensing, one or more in-COT resources of the subset of resources located within the COT and one or more out-COT resources of the subset of resources located outside of the COT; program code executable by the computer for causing the computer to randomly select, based on the identification and in response to a resource selection trigger, a set of transmission resources from one of more of the one or more in-COT resources and the one or more out-COT resources; and program code executable by the computer for causing the computer to transmit to a second UE using the set of transmission resources.

An eighteenth aspect, based on the seventeenth aspect, wherein the program code executable by the computer for causing the computer to sense for the COT-SI includes one of program code executable by the computer for causing the computer to sense for the COT-SI during a COT-SI sensing window located a predetermined duration prior to the resource selection trigger; or program code executable by the computer for causing the computer to sense for the COT-SI in response to the resource selection trigger.

A nineteenth aspect, based on the seventeenth aspect, wherein the program code executable by the computer for causing the computer to identify the one or more in-COT resources and one or more out-COT resources include program code executable by the computer for causing the computer to define one or more first type ERSWs including one or more sets of the one or more in-COT resources, wherein the one or more first type ERSWs may be located one of within the COT or over the COT and one or more additional COTs; program code executable by the computer for causing the computer to define one or more second type ERSWs including one or more sets of the one or more out-COT resources.

A twentieth aspect, based on the nineteenth aspect, wherein the program code executable by the computer for causing the computer to define the one or more first type ERSWs includes: program code executable by the computer for causing the computer to adjust, by the first UE, a length of at least one first type ERSW of the one or more first type ERSWs to exclude any of the one or more in-COT resources located within a predetermined threshold of an ending boundary of one of the COT or the COT and the one or more additional COTs.

A twenty-first aspect, based on the nineteenth aspect, further including program code executable by the computer for causing the computer to determine, by the first UE, that one or more initial resources of one of the one or more out-COT resources or each second type ERSW of the one or more second type ERSWs falls before the projected LBT completion time; and program code executable by the computer for causing the computer to exclude the one or more initial resources from the one of the one or more out-COT resources or the each second type ERSW of the one or more second type ERSWs.

A twenty-second aspect, based on the nineteenth aspect, further including program code executable by the computer for causing the computer to identify, by the first UE, a failure rate of a full LBT procedure associated with a location of the first UE, wherein the program code executable by the computer for causing the computer to randomly select the set of transmission resources includes: program code executable by the computer for causing the computer to randomly select the set of transmission resources from the one or more in-COT resources within a packet delay budget of a corresponding transmission packet and program code executable by the computer for causing the computer to refrain from randomly selecting from the one or more out-COT resources.

A twenty-third aspect, based on the nineteenth aspect, wherein the program code executable by the computer for causing the computer to sense for the COT-SI further includes: program code executable by the computer for causing the computer to continue to sense, after execution of the program code executable by the computer for causing the computer to randomly select, for the COT-SI until a threshold COT-SI processing time prior to the set of transmission resources.

A twenty-fourth aspect, based on the twenty-third aspect, further including program code executable by the computer for causing the computer to detect, based on the continued sensing, a subsequent COT-SI indicating that one or more identified resources of the one or more out-COT resources is located in another COT of the one or more neighboring UEs; and program code executable by the computer for causing the computer to re-identify, based on the detection, the one or more identified resources to the one or more in-COT resources.

A twenty-fifth aspect including a first UE configured for wireless communication includes at least one processor; and a memory coupled to the at least one processor, wherein the at least one processor is configured to determine, based on a projected LBT completion time, at least one of a sensing window or a first resource selection window; to sense, based on the determination, in a sidelink resource pool within a shared communication band for a subset of resources from the sidelink resource pool that are within the first resource selection window, and COT-SI from one or more neighboring UEs, wherein the COT-SI includes identification of a COT initiated by the one or more neighboring UEs and one or more parameters associated with the COT; to identify, based on the sensing, one or more in-COT resources of the subset of resources located within the COT and one or more out-COT resources of the subset of resources located outside of the COT; to randomly select, based on the identification and in response to a resource selection trigger, a set of transmission resources from one of more of the one or more in-COT resources and the one or more out-COT resources; and to transmit to a second UE using the set of transmission resources.

A twenty-sixth aspect, based on the twenty-fifth aspect, wherein the configuration of the at least one processor to sense for the COT-SI includes configuration of the at least one processor to one of sense for the COT-SI during a COT-SI sensing window located a predetermined duration prior to the resource selection trigger; or sense for the COT-SI in response to the resource selection trigger.

A twenty-seventh aspect, based on the twenty-fifth aspect, wherein the configuration of the at least one processor to identify the one or more in-COT resources and one or more out-COT resources includes configuration of the at least one processor to define one or more first type ERSWs including one or more sets of the one or more in-COT resources, wherein the one or more first type ERSWs may be located one of within the COT or over the COT and one or more additional COTs; to define one or more second type ERSWs including one or more sets of the one or more out-COT resources.

A twenty-eighth aspect, based on the twenty-seventh aspect, wherein the configuration of the at least one processor to define the one or more first type ERSWs includes configuration of the at least one processor to adjust, by the first UE, a length of at least one first type ERSW of the one or more first type ERSWs to exclude any of the one or more in-COT resources located within a predetermined threshold of an ending boundary of one of the COT or the COT and the one or more additional COTs.

A twenty-ninth aspect, based on the twenty-seventh aspect, further including configuration of the at least one processor to determine, by the first UE, that one or more initial resources of one of the one or more out-COT resources or each second type ERSW of the one or more second type ERSWs falls before the projected LBT completion time; and to exclude the one or more initial resources from the one of the one or more out-COT resources or the each second type ERSW of the one or more second type ERSWs.

A thirtieth aspect, based on the twenty-seventh aspect, further including configuration of the at least one processor to identify, by the first UE, a failure rate of a full LBT procedure associated with a location of the first UE, wherein the configuration of the at least one processor to randomly select the set of transmission resources includes configuration of the at least one processor to randomly select the set of transmission resources from the one or more in-COT resources within a packet delay budget of a corresponding transmission packet and configuration of the at least one processor to refrain from randomly selecting from the one or more out-COT resources.

A thirty-first aspect, based on the twenty-seventh aspect, wherein the configuration of the at least one processor to sense for the COT-SI further includes configuration of the at least one processor to continue to sense, after execution of the configuration of the at least one processor to randomly select, for the COT-SI until a threshold COT-SI processing time prior to the set of transmission resources.

A thirty-second aspect, based on the thirty-first aspect, further including configuration of the at least one processor to detect, based on the continued sensing, a subsequent COT-SI indicating that one or more identified resources of the one or more out-COT resources is located in another COT of the one or more neighboring UEs; and to re-identify, based on the detection, the one or more identified resources to the one or more in-COT resources.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration.

In some implementations, particular processes and methods may be performed by circuitry that is specific to a given function. In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a first user equipment (UE), comprising:
    determining, based on a projected listen-before-talk (LBT) completion time, at least one of a sensing window or a first resource selection window;
    sensing, based on the determining, in a sidelink resource pool within a shared communication band for:
        a subset of resources from the sidelink resource pool that are within the first resource selection window, and
        channel occupancy time (COT) sharing information (COT-SI) from one or more neighboring UEs, wherein the COT-SI includes identification of a COT initiated by the one or more neighboring UEs and one or more parameters associated with the COT;
    identifying, based on the sensing, one or more in-COT resources of the subset of resources located within the COT and one or more out-COT resources of the subset of resources located outside of the COT;
    randomly selecting, based on the identifying and in response to a resource selection trigger, a set of transmission resources from one of more of the one or more in-COT resources and the one or more out-COT resources; and
    transmitting to a second UE using the set of transmission resources.

2. The method of claim 1, wherein the sensing for the COT-SI includes one of:
    sensing for the COT-SI during a COT-SI sensing window located a predetermined duration prior to the resource selection trigger; or
    sensing for the COT-SI in response to the resource selection trigger.

3. The method of claim 1, wherein the identifying the one or more in-COT resources and one or more out-COT resources include:
    defining one or more first type effective resource selection windows (ERSWs) including one or more sets of the one or more in-COT resources, wherein the one or more first type ERSWs may be located one of within the COT or over the COT and one or more additional COTs;
    defining one or more second type ERSWs including one or more sets of the one or more out-COT resources.

4. The method of claim 3, wherein the defining the one or more first type ERSWs includes:
    adjusting, by the first UE, a length of at least one first type ERSW of the one or more first type ERSWs to exclude any of the one or more in-COT resources located within a predetermined threshold of an ending boundary of one of the COT or the COT and the one or more additional COTs.

5. The method of claim 3, further including:
    determining, by the first UE, that one or more initial resources of one of the one or more out-COT resources or each second type ERSW of the one or more second type ERSWs falls before the projected LBT completion time; and excluding the one or more initial resources from the one of the one or more out-COT resources or the each second type ERSW of the one or more second type ERSWs.

6. The method of claim 3, further including:

identifying, by the first UE, a failure rate of a full LBT procedure associated with a location of the first UE, wherein the randomly selecting the set of transmission resources includes:

randomly selecting the set of transmission resources from the one or more in-COT resources within a packet delay budget of a corresponding transmission packet and refraining from randomly selecting from the one or more out-COT resources.

7. The method of claim 3, wherein the sensing for the COT-SI further includes:

continued sensing, after the randomly selecting, for the COT-SI until a threshold COT-SI processing time prior to the set of transmission resources.

8. The method of claim 7, further including:

detecting, based on the continued sensing, a subsequent COT-SI indicating that one or more identified resources of the one or more out-COT resources is located in another COT of the one or more neighboring UEs; and re-identifying, based on the detecting, the one or more identified resources to the one or more in-COT resources.

9. A first user equipment (UE) configured for wireless communication, comprising:

means for determining, based on a projected listen-before-talk (LBT) completion time, at least one of a sensing window or a first resource selection window;

means for sensing, based on the means for determining, in a sidelink resource pool within a shared communication band for:

a subset of resources from the sidelink resource pool that are within the first resource selection window, and channel occupancy time (COT) sharing information (COT-SI) from one or more neighboring UEs, wherein the COT-SI includes identification of a COT initiated by the one or more neighboring UEs and one or more parameters associated with the COT;

means for identifying, based on the means for sensing, one or more in-COT resources of the subset of resources located within the COT and one or more out-COT resources of the subset of resources located outside of the COT;

means for randomly selecting, based on the means for identifying and in response to a resource selection trigger, a set of transmission resources from one of more of the one or more in-COT resources and the one or more out-COT resources; and means for transmitting to a second UE using the set of transmission resources.

10. The first UE of claim 9, wherein the means for sensing for the COT-SI includes one of:

means for sensing for the COT-SI during a COT-SI sensing window located a predetermined duration prior to the resource selection trigger; or means for sensing for the COT-SI in response to the resource selection trigger.

11. The first UE of claim 9, wherein the means for identifying the one or more in-COT resources and one or more out-COT resources include:

means for defining one or more first type effective resource selection windows (ERSWs) including one or more sets of the one or more in-COT resources, wherein the one or more first type ERSWs may be located one of within the COT or over the COT and one or more additional COTs;

means for defining one or more second type ERSWs including one or more sets of the one or more out-COT resources.

12. The first UE of claim 11, wherein the means for defining the one or more first type ERSWs includes:

means for adjusting, by the first UE, a length of at least one first type ERSW of the one or more first type ERSWs to exclude any of the one or more in-COT resources located within a predetermined threshold of an ending boundary of one of the COT or the COT and the one or more additional COTs.

13. The first UE of claim 11, further including:

means for determining, by the first UE, that one or more initial resources of one of the one or more out-COT resources or each second type ERSW of the one or more second type ERSWs falls before the projected LBT completion time; and means for excluding the one or more initial resources from the one of the one or more out-COT resources or the each second type ERSW of the one or more second type ERSWs.

14. The first UE of claim 11, further including:

means for identifying, by the first UE, a failure rate of a full LBT procedure associated with a location of the first UE, wherein the randomly selecting the set of transmission resources includes:

means for randomly selecting the set of transmission resources from the one or more in-COT resources within a packet delay budget of a corresponding transmission packet and means for refraining from randomly selecting from the one or more out-COT resources.

15. The first UE of claim 11, wherein the means for sensing for the COT-SI further includes:

means for continued sensing, after execution of the means for randomly selecting, for the COT-SI until a threshold COT-SI processing time prior to the set of transmission resources.

16. The first UE of claim 15, further including:

means for detecting, based on the continued sensing, a subsequent COT-SI indicating that one or more identified resources of the one or more out-COT resources is located in another COT of the one or more neighboring UEs; and means for re-identifying, based on the means for detecting, the one or more identified resources to the one or more in-COT resources.

17. A non-transitory computer-readable medium having program code recorded thereon, the program code comprising:

program code executable by a computer for causing the computer to determine, based on a projected listen-before-talk (LBT) completion time, at least one of a sensing window or a first resource selection window;

program code executable by the computer for causing the computer to sense, based on the determination, in a sidelink resource pool within a shared communication band for:

a subset of resources from the sidelink resource pool that are within the first resource selection window, and channel occupancy time (COT) sharing information (COT-SI) from one or more neighboring UEs, wherein the COT-SI includes identification of a COT initiated by the one or more neighboring UEs and one or more parameters associated with the COT;

program code executable by the computer for causing the computer to identify, based on the sensing, one or more in-COT resources of the subset of resources located within the COT and one or more out-COT resources of the subset of resources located outside of the COT;

program code executable by the computer for causing the computer to randomly select, based on the identification and in response to a resource selection trigger, a set of transmission resources from one of more of the one or more in-COT resources and the one or more out-COT resources; and program code executable by the computer for causing the computer to transmit to a second UE using the set of transmission resources.

18. The non-transitory computer-readable medium of claim 17, wherein the program code executable by the computer for causing the computer to sense for the COT-SI includes one of:

program code executable by the computer for causing the computer to sense for the COT-SI during a COT-SI sensing window located a predetermined duration prior to the resource selection trigger; or program code executable by the computer for causing the computer to sense for the COT-SI in response to the resource selection trigger.

19. The non-transitory computer-readable medium of claim 17, wherein the program code executable by the computer for causing the computer to identify the one or more in-COT resources and one or more out-COT resources include:

program code executable by the computer for causing the computer to define one or more first type effective resource selection windows (ERSWs) including one or more sets of the one or more in-COT resources, wherein the one or more first type ERSWs may be located one of within the COT or over the COT and one or more additional COTs;

program code executable by the computer for causing the computer to define one or more second type ERSWs including one or more sets of the one or more out-COT resources.

20. The non-transitory computer-readable medium of claim 19, wherein the program code executable by the computer for causing the computer to define the one or more first type ERSWs includes:

program code executable by the computer for causing the computer to adjust, by the first UE, a length of at least one first type ERSW of the one or more first type ERSWs to exclude any of the one or more in-COT resources located within a predetermined threshold of an ending boundary of one of the COT or the COT and the one or more additional COTs.

21. The non-transitory computer-readable medium of claim 19, further including:

program code executable by the computer for causing the computer to determine, by the first UE, that one or more initial resources of one of the one or more out-COT resources or each second type ERSW of the one or more second type ERSWs falls before the projected LBT completion time; and program code executable by the computer for causing the computer to exclude the one or more initial resources from the one of the one or more out-COT resources or the each second type ERSW of the one or more second type ERSWs.

22. The non-transitory computer-readable medium of claim 19, further including:

program code executable by the computer for causing the computer to identify, by the first UE, a failure rate of a full LBT procedure associated with a location of the first UE, wherein the program code executable by the computer for causing the computer to randomly select the set of transmission resources includes:

program code executable by the computer for causing the computer to randomly select the set of transmission resources from the one or more in-COT resources within a packet delay budget of a corresponding transmission packet and program code executable by the computer for causing the computer to refrain from randomly selecting from the one or more out-COT resources.

23. A first user equipment (UE) configured for wireless communication, the apparatus comprising:

at least one processor; and a memory coupled to the at least one processor, wherein the at least one processor is configured:

to determine, based on a projected listen-before-talk (LBT) completion time, at least one of a sensing window or a first resource selection window;

to sense, based on the determination, in a sidelink resource pool within a shared communication band for:

a subset of resources from the sidelink resource pool that are within the first resource selection window, and channel occupancy time (COT) sharing information (COT-SI) from one or more neighboring UEs, wherein the COT-SI includes identification of a COT initiated by the one or more neighboring UEs and one or more parameters associated with the COT;

to identify, based on the sensing, one or more in-COT resources of the subset of resources located within the COT and one or more out-COT resources of the subset of resources located outside of the COT;

to randomly select, based on the identification and in response to a resource selection trigger, a set of transmission resources from one of more of the one or more in-COT resources and the one or more out-COT resources; and to transmit to a second UE using the set of transmission resources.

24. The first UE of claim 23, wherein the configuration of the at least one processor to sense for the COT-SI includes configuration of the at least one processor to one of:

sense for the COT-SI during a COT-SI sensing window located a predetermined duration prior to the resource selection trigger; or sense for the COT-SI in response to the resource selection trigger.

25. The first UE of claim 23, wherein the configuration of the at least one processor to identify the one or more in-COT resources and one or more out-COT resources includes configuration of the at least one processor:

to define one or more first type effective resource selection windows (ERSWs) including one or more sets of the one or more in-COT resources, wherein the one or more first type ERSWs may be located one of within the COT or over the COT and one or more additional COTs;

to define one or more second type ERSWs including one or more sets of the one or more out-COT resources.

26. The first UE of claim 25, wherein the configuration of the at least one processor to define the one or more first type ERSWs includes configuration of the at least one processor:

to adjust, by the first UE, a length of at least one first type ERSW of the one or more first type ERSWs to exclude any of the one or more in-COT resources located within a predetermined threshold of an ending boundary of one of the COT or the COT and the one or more additional COTs.

27. The first UE of claim 25, further including configuration of the at least one processor:

to determine, by the first UE, that one or more initial resources of one of the one or more out-COT resources or each second type ERSW of the one or more second type ERSWs falls before the projected LBT completion time; and to exclude the one or more initial resources from the one of the one or more out-COT resources or the each second type ERSW of the one or more second type ERSWs.

28. The first UE of claim 25, further including configuration of the at least one processor:

to identify, by the first UE, a failure rate of a full LBT procedure associated with a location of the first UE, wherein the configuration of the at least one processor to randomly select the set of transmission resources includes configuration of the at least one processor:

to randomly select the set of transmission resources from the one or more in-COT resources within a packet delay budget of a corresponding transmission packet and configuration of the at least one processor to refrain from randomly selecting from the one or more out-COT resources.

29. The first UE of claim 25, wherein the configuration of the at least one processor to sense for the COT-SI further includes configuration of the at least one processor:

to continue to sense, after execution of the configuration of the at least one processor to randomly select, for the COT-SI until a threshold COT-SI processing time prior to the set of transmission resources.

30. The first UE of claim 29, further including configuration of the at least one processor:

to detect, based on the continued sensing, a subsequent COT-SI indicating that one or more identified resources of the one or more out-COT resources is located in another COT of the one or more neighboring UEs; and to re-identify, based on the detection, the one or more identified resources to the one or more in-COT resources.

* * * * *